United States Patent
Thomas et al.

(10) Patent No.: US 9,168,409 B2
(45) Date of Patent: *Oct. 27, 2015

(54) THERMAL TREATMENT OF A CONTAMINATED VOLUME OF MATERIAL

(71) Applicants: David Glynn Thomas, Perth (AU); Thomas Reece Peargin, El Cerrito, CA (US); Roderick James Travis, Perth (AU)

(72) Inventors: David Glynn Thomas, Perth (AU); Thomas Reece Peargin, El Cerrito, CA (US); Roderick James Travis, Perth (AU)

(73) Assignee: Chevron U.S.A. Inc., San Ramon, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/673,793

(22) Filed: Nov. 9, 2012

(65) Prior Publication Data

US 2013/0310624 A1    Nov. 21, 2013

Related U.S. Application Data (63) Continuation-in-part of application No. 13/454,426, filed on Apr. 24, 2012.

(60) Provisional application No. 61/484,491, filed on May 10, 2011.

(51) Int. Cl.
| | | |
|---|---|---|
| B09C 1/06 | (2006.01) | |
| A62D 3/40 | (2007.01) | |
| B09B 3/00 | (2006.01) | |

(Continued)

(52) U.S. Cl.
CPC ............. *A62D 3/40* (2013.01); *B09B 3/0066* (2013.01); *B09B 3/0083* (2013.01); *B09C 1/06* (2013.01); *B09C 1/08* (2013.01); *E21B 21/066* (2013.01); *F23C 99/006* (2013.01); *F23G 7/14* (2013.01); *F23G 2209/24* (2013.01)

(58) Field of Classification Search
USPC ................. 405/128.1, 128.15, 128.7, 128.85, 405/128.45, 128.6; 175/66; 110/188, 191, 110/229, 348, 346
See application file for complete search history.

(56) References Cited

U.S. PATENT DOCUMENTS

| | | | |
|---|---|---|---|
| 797,624 A | 8/1905 | Staudt | |
| 2,784,286 A * | 3/1957 | Dillon | 219/415 |

(Continued)

FOREIGN PATENT DOCUMENTS

| | | |
|---|---|---|
| JP | 08-141537 | 6/1996 |
| JP | H 08-141537 | 6/1996 |

(Continued)

OTHER PUBLICATIONS

Pironi, Paolo; Smouldering Combustion of Organic Liquids in Porous Media for Remediating NAPL-contaminated Soils; 2009.*

(Continued)

*Primary Examiner* — Sean Andrish
(74) *Attorney, Agent, or Firm* — Frank C. Turner; Carlos L. Hanze (57) ABSTRACT

A method for treating a volume of porous contaminated material is described. A combustible mixture (24) comprising a porous matrix and a distributed combustible contaminant is conveyed to a reaction vessel (12) having an ignition system (16). The ignition system is activated to initiate a smoldering combustion process in the reaction vessel and an oxidizer is distributed into the reaction vessel to sustain the smoldering combustion process. The porous matrix may comprise drill cuttings (324) with residual drilling fluid.

10 Claims, 6 Drawing Sheets

(51) Int. Cl.
*B09C 1/08* (2006.01)
*E21B 21/06* (2006.01)
*F23C 99/00* (2006.01)
*F23G 7/14* (2006.01)

(56) References Cited

U.S. PATENT DOCUMENTS

| | | | | |
|---|---|---|---|---|
| 4,683,963 | A * | 8/1987 | Skinner | 175/66 |
| 5,190,405 | A * | 3/1993 | Vinegar et al. | 405/128.4 |
| 5,190,645 | A * | 3/1993 | Burgess | 210/144 |
| 5,769,569 | A | 6/1998 | Hosseini | |
| 6,553,901 | B2 * | 4/2003 | Reddoch | 100/45 |
| 8,132,987 | B2 | 3/2012 | Gerhard et al. | |
| 2004/0228690 | A1 * | 11/2004 | Stegemeier et al. | 405/128.45 |
| 2008/0217065 | A1 * | 9/2008 | McCosh | 175/66 |
| 2009/0180836 | A1 | 7/2009 | Gerhard et al. | |
| 2012/0272878 | A1 | 11/2012 | Grant et al. | |

FOREIGN PATENT DOCUMENTS

| | | |
|---|---|---|
| JP | 09-206726 | 8/1997 |
| JP | H 09-206726 | 8/1997 |
| JP | 11-351533 | 12/1999 |
| JP | H 11-351533 | 12/1999 |
| JP | 2004-167390 | 6/2004 |
| JP | 2008-253912 | 10/2008 |

OTHER PUBLICATIONS

International Search Report, mailed on Aug. 9, 2012, during the prosecution of International Application No. PCT/US2012/034796.
Written Opinion of the International Searching Authority, mailed on Aug. 9, 2012, during the prosecution of International Application No. PCT/US2012/034796.

* cited by examiner

THERMAL TREATMENT OF A CONTAMINATED VOLUME OF MATERIAL

CROSS-REFERENCE TO RELATED APPLICATIONS

This application is a Continuation-in-part of pending U.S. patent application Ser. No. 13/454,426, filed Apr. 24, 2012, and Provisional Application Ser. No. 61/484,491, filed May 10, 2011, the contents of which are incorporated by reference in its entirety.

FIELD OF THE INVENTION

The present invention relates to a method and system for remediating contaminated material by thermal treatment. In particular, the invention relates to methods of remediating material by smoldering combustion processes.

BACKGROUND OF THE INVENTION

A commonly encountered problem is the need to remediate soils or other materials such as drilling cuttings that have been contaminated with industrial chemicals such as oily wastes. Soils are often contaminated with hydrocarbons such as oil and fuels. In some instances the contaminants may include materials such as asbestos.

Various thermal treatments for remediating contaminated land have been proposed. For example, U.S. Pat. No. 5,769,569 describes an in-situ thermal desorption system that is used to mobilize and remove non-volatile and semi-volatile hydrocarbons from contaminated soil. Combustion is initiated in a burner underneath the contaminated soil zone and persistent hydrocarbons are thermally desorbed by direct heating of the contaminated zone. The generated soil vapors are collected and the desorbed vapors axe processed in a hydrocarbon recovery and treatment assembly.

German patent application 2 020 612, filed on 28 Apr. 1970, describes a method and device for eliminating oil that has penetrated into the soil. A borehole is drilled in the earth down to the contaminated region. The oil in the soil is brought to a combustion temperature. Once the oil has reached its combustion temperature and is burning automatically, then it is only necessary to supply oxygen to sustain the combustion. The oil is thus incinerated within the earth at its location, i.e. in-situ treatment.

A similar process is described in German application DE 36 19 494 A1, filed on 6 Oct. 1986. Injection torches are introduced into the soil to generate a high temperature, using added air at the deepest point of the injection hole. This heats the ground sufficiently such that combustible substances such as waste oils and the like are ignited, thus achieving in-situ incineration of the soil contamination. There may be combustion of the contaminated soil up to the surface.

A further such process is described in the International application WO 2007/066125, filed on 8 Dec. 2006. Land contaminated with combustible materials may be cleaned or remediated by combusting the materials in-situ (i.e. within the ground). Combustion of the material may be self-sustaining in that it may only be necessary to supply sufficient energy to ignite the material. Once ignited, combustion may proceed in the presence of oxygen. This is contrasted with known thermal remediation processes which require continuous energy input to sustain the incineration.

There is an ongoing need for cost-effective methods of treating contaminated material.

SUMMARY OF THE INVENTION

According to a first aspect of the invention there is provided a method for treating a volume of porous contaminated material, comprising: providing a combustible mixture comprising a porous matrix and a distributed combustible contaminant; conveying the combustible mixture to a reaction vessel having an ignition system; activating the ignition system to initiate a smoldering combustion process in the reaction vessel, and distributing an oxidizer into the reaction vessel to sustain the smoldering combustion process.

The porous matrix may comprise drill cuttings and the distributed combustible contaminant may comprise drilling fluid, which may be an oil-based drilling fluid or a synthetic drilling fluid. The synthetic drilling fluid may, for example, be selected from the group consisting of internal olefins, poly-alpha-olefins, linear-alpha-olefins, acetyls, di-ethers, linear paraffins, detergent alkalytes, polyols, methyl glycoside and ester-based fluids. The method may further comprise: collecting off-gases from the reaction vessel during the smoldering combustion process; and processing the off-gases to recover contaminants vaporised in the reaction vessel. An example of such a contaminant is mercury. The reaction vessel may be operated in batch or continuous-feed modes.

According to a further aspect of the invention there is provided a system for treating drill cuttings comprising: a separation system that receives material from a well-drilling operation, the material comprising drill cuttings and drilling fluid, the separation system (a) extracting drilling fluid for recycling back to the well-drilling operation and (b) providing an output comprising the drill cuttings and residual drilling fluid; a reaction vessel that receives the output of the separation system, the reaction vessel comprising: i) an ignition system; and ii) a distribution structure for distributing a gaseous oxidizer into the reaction vessel; and a control system in data communication with the ignition system and the distribution structure, the control system comprising software instructions for executing on one or more data processors to: A) activate the ignition system to initiate a smoldering combustion process in at least a portion of the material in the reaction vessel; and B) control the distribution of the oxidizer into the reaction vessel to sustain the smoldering combustion process.

As used herein, except where the context requires otherwise, the term "comprise" and variations of the term, such as "comprising", "comprises" and "comprised", are not intended to exclude further additives, components, integers or steps.

Further aspects of the present invention and further embodiments of the aspects described in the preceding paragraphs will become apparent from the following description, given by way of example and with reference to the accompanying drawings.

DETAILED DESCRIPTION OF THE EMBODIMENTS

It has been recognized that smoldering combustion processes may be a useful technique in the remediation of contaminated soils. In some instances the contaminated material may not include an adequate concentration of combustible material to sustain efficient combustion. In other instances there may be specific requirements that the combustion process must satisfy in order to effectively remediate the contaminated material. An example of this is the case of soil contaminated with friable asbestos fibers. Asbestos may be converted to inert non-hazardous silicate-based material by heating the asbestos to between 800° C. and 1,200° C.

Described herein is a method for thermal treatment of contaminated material in which a porous combustible mixture is subjected to smoldering combustion to treat contaminants in the mixture. The combustible mixture is porous, providing interstitial spaces which may be occupied by a fuel material. The ratio of porous contaminated material to fuel material is determined such that a smoldering combustion process may be initiated in the combustible mixture in order to remediate the contaminated material. In some applications such as the treatment of asbestos, an objective of adding the fuel material is to ensure that the resulting smoldering combustion process reaches the required temperature range.

Note, certain aspects of the present invention may be described and implemented in the general context of a system and computer methods to be executed by a computer. Such computer-executable instructions may include programs, routines, objects, components, data structures, and computer software technologies that can be used to perform particular tasks and process abstract data types. Software implementations of the present invention may be coded in different languages for application in a variety of computing platforms and environments. It will be appreciated that the scope and underlying principles of the present invention are not limited to any particular computer software technology.

Also, an article of manufacture for use with a computer processor, such as a CD, pre-recorded disk or other equivalent devices, may include a computer program storage medium and program means recorded thereon for directing the computer processor to facilitate the implementation and practice of the present invention. Such devices and articles of manufacture also fall within the spirit and scope of the present invention.

Reaction Vessel for Smoldering Combustion

Figure 1:
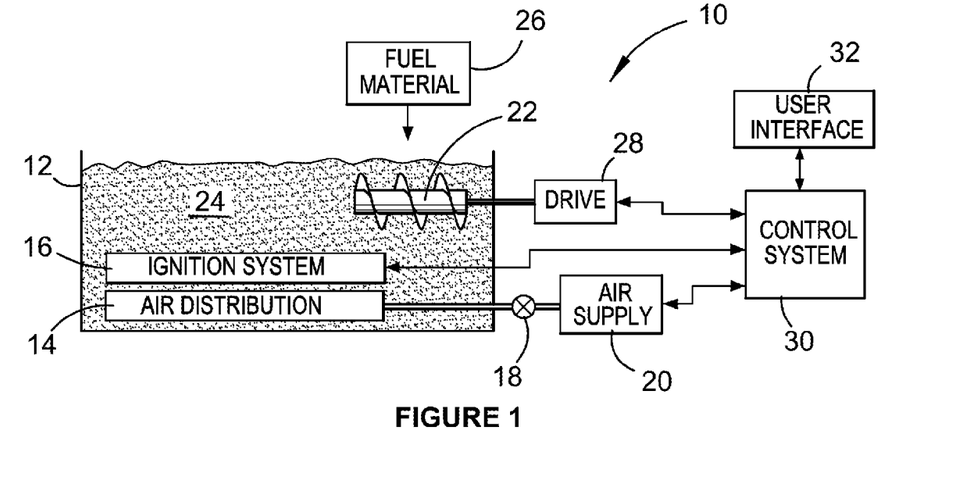
FIG. 1 is a schematic diagram of a system including a reaction vessel in which a smoldering combustion process is initiated to remediate contaminated material.

FIG. 1 shows a schematic representation of a system 10 in which the smoldering combustion process may be operated.

The smoldering combustion process takes place in a reaction vessel 12 which may be constructed above the ground or at the ground surface. A wide range of materials may be used to construct the vessel 12, including for example metals, bricks and mounded earth.

The vessel includes a structure 14 for distributing air into the vessel. Although the depicted arrangement illustrates the distribution of air, more generally the system 14 may be used to distribute a gas that acts to sustain the smoldering combustion process once initiated in the vessel. Examples of such gases include oxygen, oxygen-enriched air or other gases that are appropriate for sustaining a smoldering combustion process or which serve to optimize the remediation of a particular contaminant present in the treated material. Thus, air used to propagate the smoldering combustion process may be supplemented with a fuel or another gas, for example natural gas, propane, butane, nitrogen, nitrous oxide or carbon dioxide, in order to control or modify the properties of the combustion process.

The air distribution structure 14 may be a network of piping that is perforated or slotted to enable the passage of gas into the reaction vessel. The network of piping may, for example, be a metal or ceramic structure. The feedpipe to the air distribution structure 14 includes an actuator 18 that is used to control the pressure or flow rate of gas into the distribution structure 14. The system includes an air supply 20, which may include a compression system to supply compressed air to the distribution structure 14. If an additional gas is added to the air supply there may be further storage vessels to store the additional gas and controllable valves operable to mix the additional gas with the air supply.

The reaction vessel 12 also includes an ignition system 16, which serves to raise the temperature of the combustible mixture 24 in the vicinity of the ignition system to a temperature that is sufficiently high to initiate the smoldering combustion. There are several ways in which the ignition system 16 may be implemented. For example, the ignition system may use electrical resistance heating to increase temperature. Alternatively, the ignition system may include a gas burner that burns an ignition gas in order to raise the temperature of the surrounding mixture. In this case, the ignition system would include a feedpipe to the exterior of the vessel 12 in order to supply the ignition fuel to the ignition system. An actuator and gas supply would then be provided to control the flow of the ignition fuel to the ignition system 16. Once the smoldering combustion has been initiated, the ignition system may be deactivated.

Porous Combustible Mixture

In use, the reaction vessel 12 contains a contaminated material for remediation. An example of such a contaminated material is an oily waste, which may be liquid, solid or a mixture of both phases. The contents of the vessel may also include porous media to act as a matrix for the smoldering combustion process. The porous matrix may, for example, be sand or soil onto which the oily waste has been spilt or deposited. In other applications an inert material such as ceramic balls or sand may be added to the contents of the vessel in order to provide a framework for the combustion. The porosity of the material in the vessel should be sufficient to allow penetration of a fuel material and to permit a flux of an oxidizer such as air to sustain the smoldering combustion. The porous matrix in the reaction vessel may include particulates, grains, fibers or mixtures thereof. Porosity is a parameter that describes the ratio of void space to the total bulk of the material. The porosity of the contaminated material in the reaction vessel may range, for example, between around 0.01 for material such as rock to around 0.7 for a porous clay or peat.

A fuel material 26 is combined with the contaminated material in the reaction vessel in order to ensure that sufficient conditions exist for a combustion process to be initiated by the ignition system 16. The fuel material 26 may include waste oil, sludge or other predominately oily waste. Examples of such a waste are tank-bottom sludges and oil sediments that derive from settling ponds. Other examples of fuel material include coal, coke, diesel fuel, drilling fluid and paraffin. The fuel material may include solids, liquids or liquids with suspended solid material. One way of measuring the proportion of combustible material in the combustible mixture 24 is to consider the volume fraction of the pore space that is occupied by combustible material. Preferably the volume fraction in the combustible mixture is greater than 1% to enable a self-sustaining combustion front to propagate through the vessel. A target range of the volume fraction in the combustible mixture 24 is 1% to 25%.

Higher volume fractions, for example in the range 25%-50% may also be used, although there may be trade-offs to consider in establishing a target range. For example, the overall cost of the remediation process may increase if greater quantities of fuel material are added. Also, adding large amounts of fuel material 26 may reduce the available volume in the reaction vessel for the contaminated volume of porous material.

Another measure for characterizing the combustible mixture 24 is the mass of combustible material per unit mass of the mixture 24. In the case of coal tars it has been shown that smoldering combustion may be sustained if the concentration of coal tar is in the range of 28,400 to 142,000 mg/kg. In the case of crude oil it has been shown that smoldering combustion may be sustained if the concentration of crude oil is in the range of 31,200 to 104,000 mg/kg. This combustion is discussed in Pironi et al "Self-sustaining smoldering combustion for NAPL remediation: laboratory evaluation of process sensitivity to key parameters", *Environ. Sci. Technol.* 2011, 45, 2980-2986.

Thus, for example, if a contaminated volume of material has a volume fraction of combustible material in the pore space less than about 1%, the contaminated volume may not be suitable for thermal treatment by smoldering or flameless combustion. Using the methods described herein, a fuel material is combined with the contaminated volume of material in order to increase the volume fraction into the target range of around 1-25%. A smoldering combustion process may then be initiated. In another example, if a contaminated volume of material contains less than 30,000 mg/kg of crude oil, the contaminated volume may be remediated by combination with a fuel material and initiation of smoldering combustion. These are not hard ranges for the proportion of fuel material, and the criterion is whether there is sufficient combustible material in the porous contaminated mixture to sustain a smoldering combustion process.

In some applications the fuel material 26 may be sufficiently fluid to be poured onto the volume of contaminated material in the reaction vessel. In this case, the fluid fuel material seeps through the interstitial spaces of the contaminated material to spread through the volume of the reaction vessel 12.

The fuel material 26 may also consist of or include a non-waste liquid or solid. An example is a food-grade environmentally-friendly oil such as a vegetable oil. Such non-waste fuel materials may, for example, be injected or blended into the porous contaminated material in areas where waste materials may not be appropriate or where use of waste materials may be regulated or forbidden.

Reduction of Heterogeneity

The reaction vessel 12 may include an actuator 22 to mix or blend the contaminated material and the added fuel material in order to reduce the heterogeneity of the resulting combustible mixture 24. An example of an actuator 22 is a soil auger having a helical structure to turn and blend the combustible mixture 24. The actuator 22 may have an associated drive 28. In some arrangements the actuator 22 may be a mobile system that is inserted into the reaction vessel in order to blend the material during the combining or admixing of the fuel material and the porous contaminated material. In other arrangements the contaminated material may be combined with the fuel material before the resulting combination is added to the reaction vessel. For example, the combination may occur in a storage vessel (not shown). The combustible mixture may then be transported to the reaction vessel 12, for example via a pipe or conveyor system or in a vehicle. In some instances earth-moving equipment may be used to combine or blend the combustible mixture 24.

The purpose of the combining or mixing is to reduce the heterogeneity of the combustible mixture and provide a relatively even distribution of combustible material in the mixture. In general, it is not necessary to eliminate variation of the material. However it is desirable to avoid having regions within the reaction vessel that do not have a sufficient concentration of combustible material to sustain the smoldering combustion process.

Control System

The system 10 may include a control system 30 that is programmed to supervise the operation of the thermal treatment. The control system 30 typically includes at least one computational device, which may be a microprocessor, a microcontroller, a programmable logical device or other suitable device. Instructions and data to control operation of the computational device may be stored in a memory which is in data communication with, or forms part of, the computational device. Typically, the control system 30 includes both volatile and non-volatile memory and more than one of each type of memory. The instructions and data for controlling operation of a system 10 may be stored on a computer readable medium from which they are loaded into the memory. Instructions and data may be conveyed to the control system by means of a data signal in a transmission channel. Examples of such transmission channels include network connections, the internet or an intranet and wireless communication channels.

The control system 30 is typically in data communication with a user interface 32 that allows users to enter information into the control system and also includes displays to enable users to monitor the operation of the system 10. The control system is in data communication with the air distribution system 14, actuator 18, air supply 20, and the drive 28 of the actuator 22.

The control system 30 may, for example, be a SCADA system, which provides system control and data acquisition.

The system 10 may include instrumentation to monitor various aspects of the operation. For example, flow meters may be provided on the feed systems to the air distribution structure 14 and, if appropriate, to the ignition system 16. Pressure gauges may be provided for use with the air supply 20. Temperature measurements may also be positioned in or around the vessel 12 to monitor the state of the vessel and the combustion process occurring therein. In addition, cameras may be provided to enable remote monitoring of the operation of the reaction vessel 12.

Where such instrumentation is provided, the data generated by the instrumentation may be displayed locally in the vicinity of the instruments. Alternatively or in addition, the data may be provided to the control system 30 for display on the user interface 32 and storage in memory.

The combustion front in the reaction vessel 12 is typically a narrow region that is relatively planar and parallel to the base of the reaction vessel. In a batch process the combustion front moves upward through the vessel, oxidizing organic compounds as the combustion front progresses. If the temperature profile in the vessel is monitored, the temperature and speed of the combustion front may be controlled by manipulating the flux of air into the reaction vessel. Tests indicate that there is an inverse approximately linear relationship between the burn time and the air flow rate per mass of oil in the combustible mixture. The greater the air flow per mass of oil, the shorter the burn time in the reaction vessel.

Most of the heat of the combustion front is retained by the porous combustible mixture and consequently there are low heat losses from the reaction vessel.

Optimizing Remediation of Contaminated Material

The contaminated material in the reaction vessel 12 may contain concentrations of contaminants that would be prone to treatment or destruction by temperatures in excess of 400° C., but where the concentration of material in the soil is initially less than what is necessary to optimize the reaction. Examples of contaminants include chlorinated solvents, polychlorinated biphenyls (PCB), dioxins, furans and polynuclear aromatic hydrocarbons (PAH).

The fuel material 26, which may also include contaminants for thermal treatment is added to increase concentrations of material in the combustible mixture 24 to a level that is sufficient to provide or optimize the reaction that treats or destroys the contaminants. In many applications the desired combustion occurs in the temperature range of 400° C. to 1,000° C. In some instances such as the treatment of friable asbestos fibers, higher temperatures may be required, for example a temperate range between 800° C. and 1,200° C.

Vapor Treatment

Figure 2:
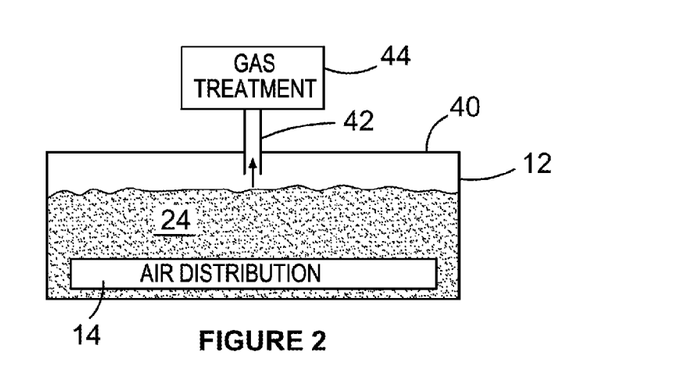
FIG. 2 is a schematic diagram of a reaction vessel having a cover to capture off-gases from the smoldering combustion process within the reaction vessel.

FIG. 2 is a schematic depiction of an alternative arrangement in which the reaction vessel 12 is provided with a cover 40 that serves to trap off-gases produced in the combustion of the combustible mixture 24. One or more flues 42 are provided in the cover 40 to remove the gases to a gas treatment process 44.

Figure 5:
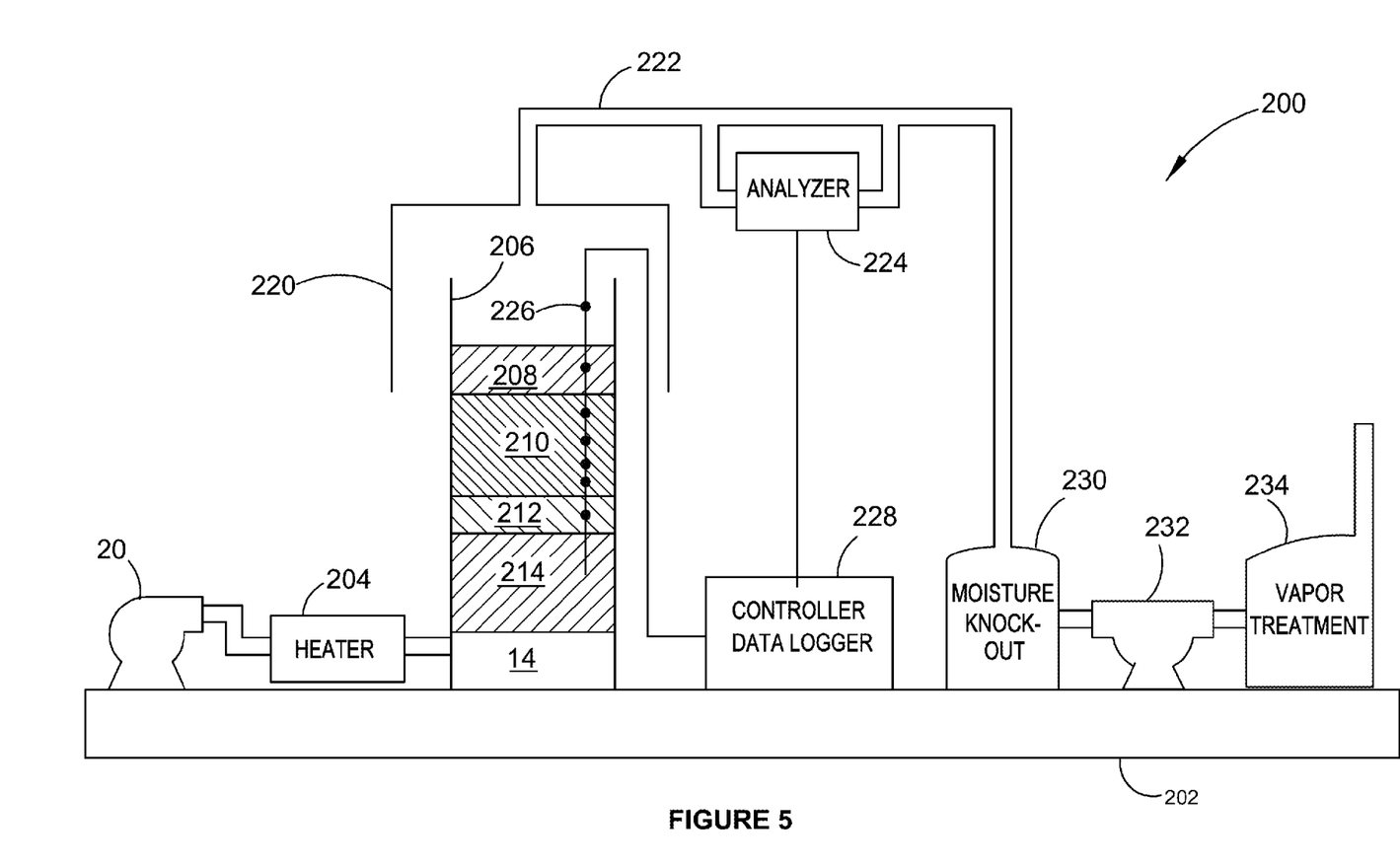
FIG. 5 is a schematic diagram of a mobile remediation system including a reaction vessel for smoldering combustion.

FIG. 5 shows a further embodiment of a remediation system 200 that is able to process off-gases. The system 200 includes a reaction vessel 206 in which a smoldering combustion process is used to treat a porous combustible mixture loaded into the reaction vessel 206.

The reaction vessel 206 has an air distribution structure 14 at its base. Air is injected into the distribution structure 14 by an air supply unit such as pump 20. Air injected from the air supply 20 may be heated by heater element 204 before introduction into the air distribution structure 14.

There may be different regions of operation within the reaction vessel. When operated as a batch process, a combustion front 212 progresses from the lower end of the reaction vessel to the upper end. The combustion front is typically relatively planar and moves upwards through the soil column oxidizing the organic compounds contained in the porous combustible mixture 210. The rate of movement of the combustion front 212 depends, amongst other factors, on the air flux into the air distribution structure. The rate of air injection may also depend on the percentage of combustible contaminants in the mixture 210. For example, a low air injection rate may be used when there is a high oil level in the mixture 210 and the oil is mobile. Higher injection rates may be used when there is merely a residual level of oil in the mixture 210.

As the combustion front 212 progresses up the reaction vessel 206, it leaves clean, remediated material 214 beneath it in the vessel 206. A layer of clean material 208 may be placed near the top of the reaction vessel 206, covering the porous combustible mixture 210. The clean covering layer 208 may limit the chance of ignition or flaming combustion near the top of the vessel 206.

An array of temperature sensors 226, for example thermocouples, may be provided at intervals to measure a temperate profile in the reaction vessel 206. Measurements from the array of thermocouples may be communicated to a controller/data logger 228. The temperature measurements may, for example, be used in controlling the flow rate of injection air into the air distribution system 14. The recorded information may also be stored for later analysis.

In the depicted arrangement, a vapor extraction hood 220 captures vapor emanating from the reaction vessel 206. The extracted vapors may include volatile contaminants that are released by heating the mixture 210 and are then entrained in air or water vapor extracted from the reaction vessel 206. Ducting system 222 removes vapors from the vapor extraction hood 220. An off-gas analyzer 224 may be provided to analyze the contents of the extracted vapors. The analyzer 224 is in data communication with the controller and data logger 228. The vapor analysis may be stored by the data logger. The controller may also include a communication system to transmit information from the system 200 to remotely-located data processing and data storage facilities.

The ducting system 222 that conveys the vapors from the vapor extraction hood 220 may initially rise vertically and then travel downward to a moisture knock-out unit 230. This rise and subsequent drop enables condensed vapor to be captured in the moisture knock-out unit 230. Remaining vapor may be conveyed by extraction blower 232 to a vapor treatment unit 234.

An example of a volatile contaminant that may be removed from the combustible mixture 210 is mercury.

The remediation system 200, or sub-components thereof, may be mounted on a mobile base 202. In this way, the remediation facility may be moved close to the source where the contaminated material for remediation is located. It will be appreciated that there are many ways in which the mobile base 202 may be moved, including wheels on multiple axles, skids and caterpillar tracks.

Furthermore, the mobile base may be mounted on a barge or other floating vessel. Such arrangements allow the remediation facility to be transported at sea or over marshy terrain in order to provide ready access to the contaminated material requiring remediation. The base 202 may include an engine with a means to drive the system 200. Alternatively the base 202 may be coupled to another vehicle or vessel for transportation.

The mobile system includes at least the reaction vessel 206. Other components of the remediation system 200 may be transported separately as required for specific applications. Thus, for example, not all systems need have the vapor extraction hood and vapor treatment unit. The air supply 20 and heater unit 204 may be transported on the base 202. Alternatively, the air supply 20 and heater 204 could be moved separately from the base 202 and coupled to the reaction vessel 206 when operation is about to commence. The controller and data logger 228 may also be conveyed separately from the reaction vessel 206.

Excavated Reaction Vessel

Figure 3:
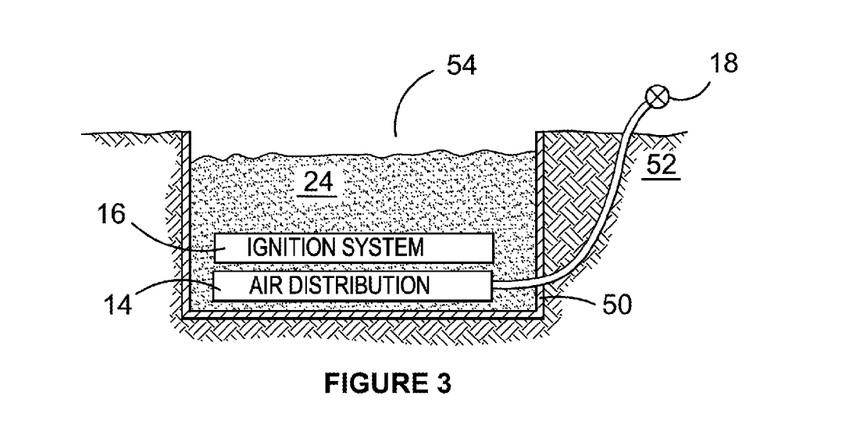
FIG. 3 is a schematic diagram of an arrangement in which a pit is excavated in the ground to provide a reaction vessel for the smoldering combustion process.

A further arrangement is shown in FIG. 3, in which a pit 54 is excavated in the ground 52 in order to provide a reaction vessel for the thermal treatment of contaminated material. The pit 54 may be lined with a thermal barrier 50 which may serve to limit or prevent the flow of liquids or gases from the pit 54 to adjacent regions. The barriers 50 may also serve to insulate the pit 54 to limit heat losses from the combustion process. Such thermal insulation may serve to improve the efficiency of the combustion.

A distribution structure 14 is provided in the reaction vessel to provide a suitable flow of gaseous oxidizer into the combustible mixture 24. A feedpipe links the air distribution structure to a valve 18 and a controller to control the flow of the oxidizer into the combustible mixture. As before, an ignition system 16 is provided to raise the temperature of a region of the combustible mixture adjacent to the ignition system sufficiently high to initiate combustion.

Continuous-Feed Reactor

Figure 6:
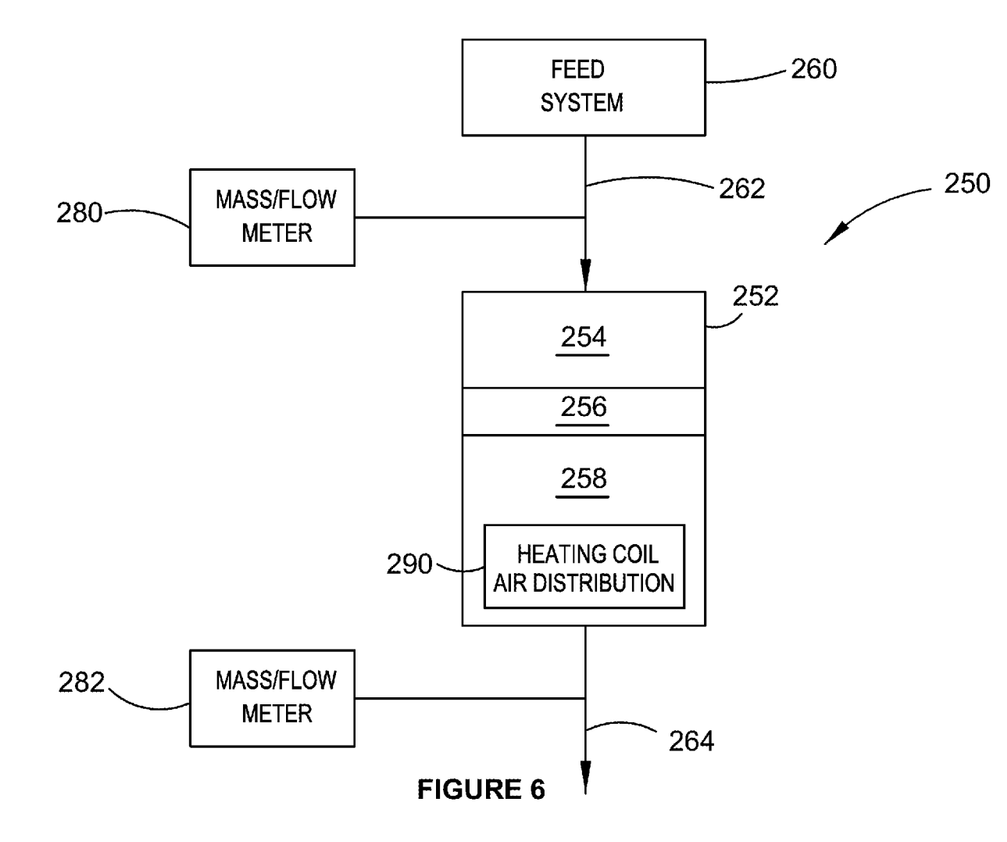
FIG. 6 is a schematic diagram of a continuous-feed vessel for smoldering combustion.

The smoldering combustion vessel may also be operated with a continuous feed, as illustrated schematically in FIG. 6. The system 250 includes a feed system 260 that feeds an oily mixture 262 into a reaction vessel 252. The input includes a porous matrix and sufficient combustible material to sustain a smoldering combustion process in the reaction vessel 252.

A smoldering zone 256 is contained in a central portion of the reaction vessel. The smoldering zone 256 is a generally planar region parallel to the base of the vessel 252. The smoldering zone may be narrow relative to the height of the vessel 252.

There is an output stream 264 of clean material from the lower region of the reaction vessel 252. Thus, a contaminated feed moves downward through the vessel, is treated in the smoldering zone 256 and exits from the lower end of the vessel 252. By balancing the mass of material introduced to and removed from the vessel 252, operation may be maintained at a generally steady state. The location of the smoldering zone remains at a relatively constant location within the vessel.

Temperature measurements may be provided to monitor the temperature profile along the height of the vessel, for example as illustrated in FIG. 5. A control system may adjust parameters including the flow of air into the vessel 252 in order to maintain steady operation. For example, if the proportion of combustible material in the feed 262 increases, the control system may reduce the air flow. If the feed 262 is less combustible the control system may need to increase the air flow into the vessel. If the feed 262 is interrupted, the air flow may be reduced or suspended.

The contents of the reaction vessel 252 fall into three regions. The upper region 254 receives the feed 262 and contains a porous combustible mixture that enters the smoldering zone 256 as the material descends through the vessel 252. The porous combustible mixture is in general mixed and blended prior to being fed into the vessel 252. However, an actuator may be provided to reduce the heterogeneity of the mixture in the upper region 254.

The combustible component of the porous combustible mixture is largely eliminated in the smoldering zone 256 and thus the material in the lower region 258 below the smoldering zone consists of clean material which is removed from the vessel in the output stream 264.

The reaction vessel 252 includes a system 290 with a heating coil and air distribution unit, located in the lower region 258. The heating coil and air distribution unit 290 are physically non-continuous across the width of the vessel 252. For example, the structure may be a grid or labyrinth of pipes with sufficient space between the pipes for the cleaned material 258 to move to the exit stream 264. The cleaned material in region 258, having been treated in the smoldering combustion zone 256, is dry and is consequently highly mobile.

The outlet may have a valve system in place to enable a pressure build-up within the vessel, for example during initiation of the smoldering combustion process. The output flow 264 may be halted, for example if the feed 262 is interrupted.

Mass or flow meters 280, 282 may be provided to monitor the input material 262 and the removed material 264. These mass and/or flow measurements may be used by a control system to maintain the mass balance of material introduced to and removed from the vessel 252.

Fuel material may be added to the region 254 if additional combustible material is required to sustain the smoldering combustion. Fuel material may also be added to the porous mixture earlier in the process, for example within the feed system 260 or in the feed stream 262.

In-Situ Thermal Processing

In the case of in-situ thermal processing, i.e. in the ground, the properties of the contaminated porous medium are altered through processes including, but not limited to, mixing, blending, injection and hydraulic fracturing (also known as fracing), to produce conditions in the treatment zone that optimize the reaction, thereby remediating the contaminated material. As described, these operations may include blending the mixture with a soil auger to remove heterogeneities. The combustible mixture may also be blended with oil or other fuel materials to supplement or achieve a minimum concentration to support a sustainable reaction. In-situ arrangements may include pits like that shown in FIG. 3 (with or without barriers 50) or regions of the ground that have not been excavated.

Figure 8:
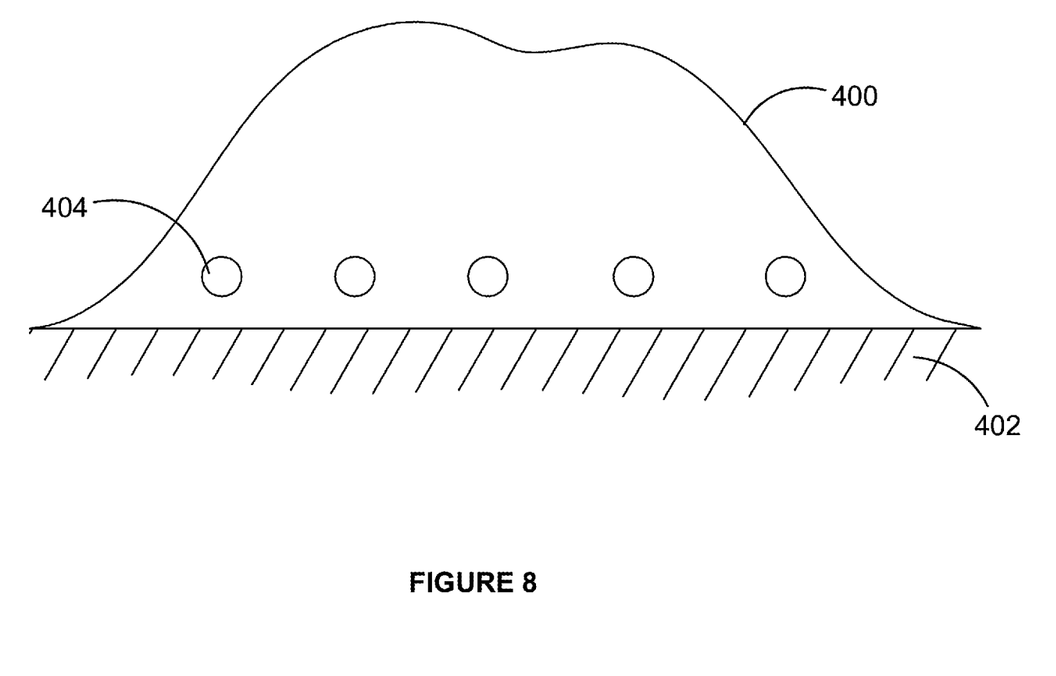
FIG. 8 is a schematic cross-section of a stockpile in which a smoldering combustion process is initiated.

Contaminated material that has been accumulated in stockpiles may also be treated by smoldering combustion, as illustrated schematically in FIG. 8. A stockpile 400 made up of a porous contaminated mixture is piled on top of a grid of pipes 404 that distribute air into the stockpile to sustain a smoldering combustion process. The pipes 404 may be located in the stockpile 400 or in the ground 402 beneath the stockpile.

The contaminated material may be piled onto an existing system of pipes 404. Alternatively, if there is an existing stockpile 400 the pipes 404 may be inserted into the stockpile 400 or the ground 402 beneath the stockpile. Trenchless technology may, for example be used to install the pipes 404.

If there is insufficient combustible material in the stockpile 400 to sustain a smoldering combustion process, fuel material may be added to the stockpile.

If needed, the material in the stockpile may be mixed to reduce heterogeneity, for example using earth-moving equipment or an auger.

In cases where contaminants in the stockpile can vaporize, the stockpile 400 may be substantially covered with a vapor barrier (not shown). Vapors that accumulate within the barrier during combustion may be extracted and processed, for example in a system including the analyzer 224, moisture knock-out 230 and vapor treatment 234 shown in FIG. 5

Smoldering Combustion

Figure 4A:
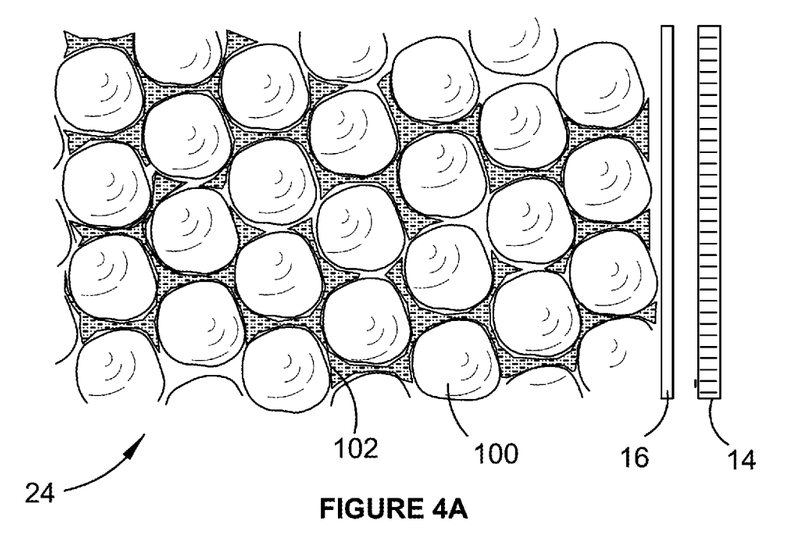
FIGS. 4A and 4B are schematic representations of the initiation of a smoldering combustion process in a combustible mixture that includes contaminated material.
Figure 4B:
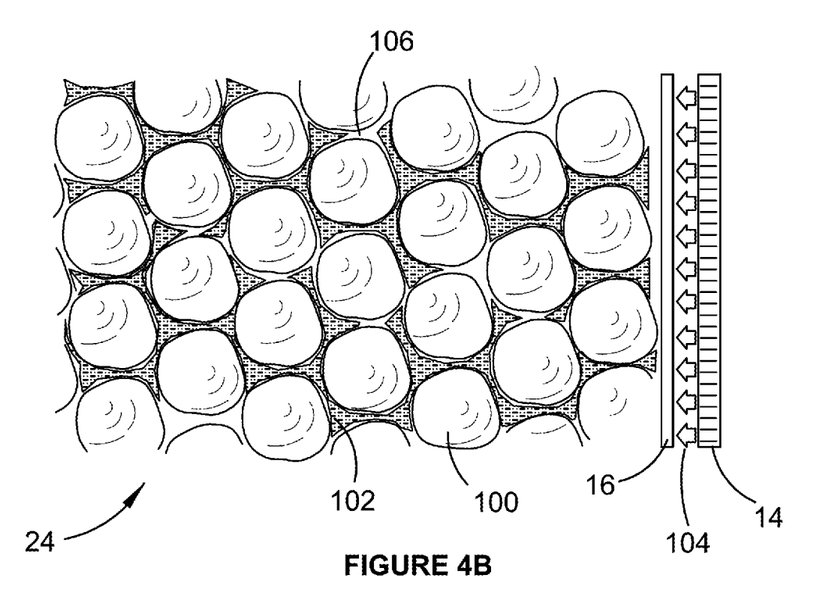

FIGS. 4A and 4B are schematic representations of the smoldering combustion process that is initiated in the reaction vessel. The combustible mixture 24 is depicturied as including a matrix of porous material, for example 100. The porous matrix 100 need not be uniform in its structural composition and may include particular material, grains or fibers. The contaminated porous material may include soil containing oily waste or other contaminants. The amount of interstitial space between the elements 100 of the contaminated mixture influences the nature of the combustion process. The pore volume available influences the amount of fluid material 102 that may be introduced between the contaminated porous material 100. The interstitial spaces may also contain air and/or moisture 106. During heating the air and vapor may entrain volatile contaminants from the combustible mixture 24. The entrained vapor may be captured in off-gases, for example in the systems of FIG. 2 or FIG. 5. In some applications pressure-reduction apparatus such as a vacuum pump may be used to enhance the removal of vapor from the combustible mixture 24. The gas treatment 44 or vapor treatment 234 may further treat the contaminants. For example, an oxidizer may be provided to incinerate the vaporized contaminants. Volatile contaminants in the combustible mixture 24 may, for example, include mercury, which may be concentrated and recovered in the gas treatment 44, 234.

The porosity of the combustible mixture 24 also has an effect on the oxidizer flux and hence on the flow rate and pressure required of the air supply 20. The control system 30 having a computer processor and computer readable media may be programmed to control or vary the air supply to the air distribution structure 14. For example, in some applications increasing the flow rate of oxidizer may increase the combustion temperature. The flow rate of oxidizer into the combustible mixture 24 may be expressed as a Darcy flux. A suitable range of oxidizer flux to sustain smoldering combustion in the reaction vessel may be 0.5 to 10.0 cm/s.

FIG. 4A shows schematically the ignition system 16 being heated to reach a specified ignition temperature. At the depicted stage, the air supply through the air distribution structure 14 may still be switched off. Once the ignition system has reached a suitable temperature, which may for example be in the range of 200° C. to 400° C., the air supply 104 is switched on. The organic waste in the combustible mixture 24 ignites and creates a smoldering combustion front that moves through the combustible mixture 24. The source of external heating via the ignition system 16 may be switched off while the air supply 104 continues in order to sustain the smoldering combustion. In some applications the combustion may provide a near complete conversion of organic wastes to $CO_2$. The combustion process ends if the combustible material in the vessel is destroyed or if the supply of oxidizer is interrupted.

Smoldering combustion processes are discussed, for example, in Pironi et al 'Small-scale forward smoldering experiments for remediation of coal tar in inert media'. *Proceedings of the Combustion Institute* 32, pp. 1957-1964, 2009. Smoldering combustion is described as the flameless burning of a condensed fuel that derives heat from surface oxidation reactions. The smoldering combustion is a relatively slow and relatively low-temperature flameless combustion sustained by the heat resulting from the combustion of an oxidizer on the surface of a condensed-phase fuel (i.e. a solid or liquid).

The methods described herein provide a potentially low-cost and effective treatment of material that would otherwise be very costly or impractical to treat at all. In many cases, the end product of the combustion process may be suitable for reuse, as opposed to previously-existing options that typically involve containment of the contaminated material requiring long-term management or off-site disposal.

The treatment and disposal of many wastes containing organic concentrates less than what is needed to sustain a smoldering reaction have the same cost and practical restraints of treating heavily impacted oily wastes. The processes described herein may appear counterintuitive as they involve making some wastes more contaminated (for example by adding higher concentrations of organic fuel) so that the resulting combustible mixture may be treated with a smoldering combustion process.

Sterilization of Wastes

The smoldering combustion processes described herein may be used to sterilize waste material. For example, if a stockpile of soil or waste material contains seeds that may germinate, there may be environmental restrictions on locations where the soil may be distributed. The restrictions may relate to the spread of alien or non-endemic plant species. Treating the soil in a smoldering combustion process destroys or sterilizes the seeds so that they will not germinate if the soil is subsequently distributed.

Fuel may be added to the soil or waste material containing the seeds in order to sustain the smoldering combustion.

Other biological wastes may also be destroyed or sterilized by smoldering combustion processes.

Stockpile Management

The operation of the reaction vessel 12 may be supplemented by the management of a plurality of stockpiles of waste material having different concentrations of contaminants. An inventory of available waste materials may be maintained in order to determine suitable sources of fuel material 26 and contaminated material for mixing in the reaction vessel 12 to achieve conditions required to treat the contaminants. Management of the stockpiles may also be operated from the control system 30. Where the combustible mixture is prepared externally of the reaction vessel, the external combination may also be supervised from the control system 30.

Treatment of Drill Cuttings

The management of drilling fluids can be a significant problem with an impact on the economics of exploratory drilling. Organisations such as the US Environmental Protection Agency (EPA) monitor and regulate the use and disposal of drilling fluids. The smoldering combustion processes described herein provide techniques for the remediation of drill cuttings contaminated with drilling fluids.

Figure 7:
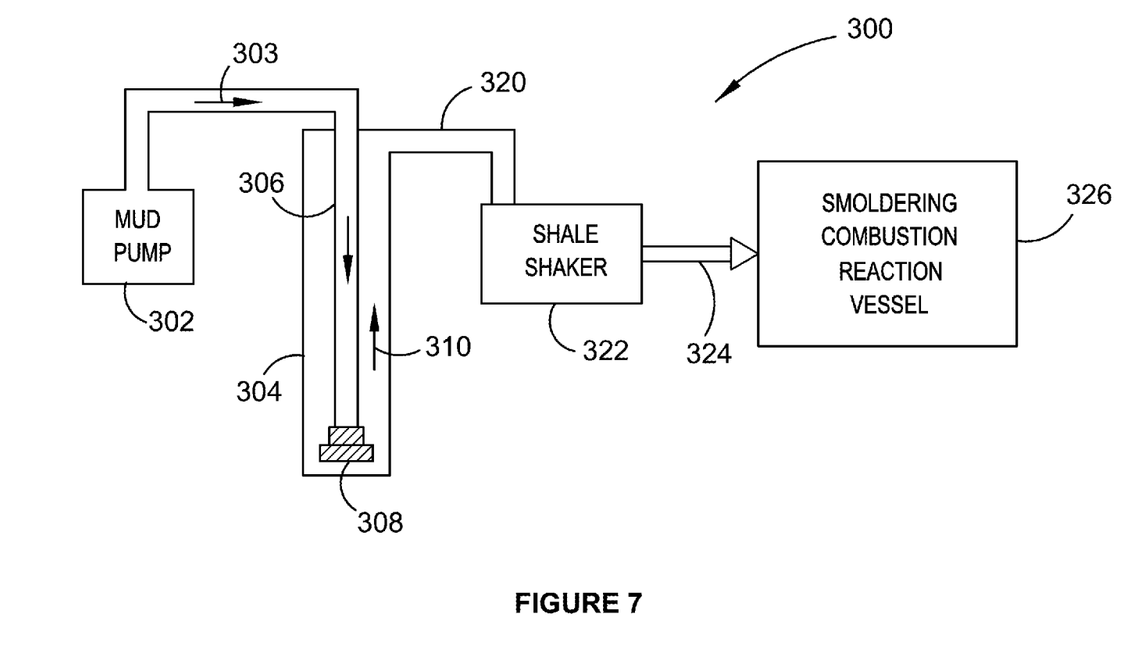
FIG. 7 is a schematic diagram of a system for remediating drilling cuttings in a vessel for smoldering combustion.

The process is illustrated schematically in FIG. 7, which shows a well 304. The well need not be vertical, and it is increasingly common to use directional drilling along inclined wells. The well 304 is formed by a rotary drill bit 308 that grinds through the earth's crust as it progresses. A drilling fluid 303 is pumped by a mud pump 302 down through a drill pipe 306 that is connected to the rotary drill bit 308. The rock chips that are generated by the action of the drill bit 308 are known as drill cuttings. The drilling fluid serves to transport the drill cuttings 310 back up to the surface via an annular space between the drill pipe 306 and the walls of the well 304.

At the surface, flow line 320 transports the drill cuttings to a separation system which removes fluids from the cuttings. The extracted drill fluid may be recycled into the system, for example eventually returning to the mud pump 302. The drill cuttings become a waste product 324. However, waste product 324 retains some drilling fluid. Effluent limitation guidelines will in general apply to the treatment, transport and disposal of waste 324.

In system 300, the drill cuttings and associated waste product provide a porous combustible mixture that may be treated in a reaction vessel 326 that may operate like the reaction vessels 12, 206, 252 described above with reference to FIGS. 1, 5 and 6.

As illustrated, the separation system may include a shale shaker 322. Other solids separation equipment such as decanting centrifuges, mud cleaners and cuttings driers may also be used.

The remediated output of the reaction vessel 326 may be sufficiently clean for discharge without violating effluent limitation guidelines.

The functions of the drilling fluid 303 include transporting the drilling cuttings back to the surface. The drilling fluids also maintain hydrostatic pressure within the well 304 to prevent formation fluids from entering the well bore. The drilling fluids also keep the drill bit 308 cool and clean during drilling and they serve to suspend the drill cuttings if drilling is paused.

Various types of drilling fluid are in use. Water-based muds (WBM) include water, clays and other chemicals.

Oil-based fluids (OBF) are muds where the base fluid is a petroleum product such as diesel fuel. OBFs include low aromatic and paraffinic oils and non-synthetic mineral oil-based fluids. Compared with WBMs, OBFs provide increased lubrication, enhanced shale inhibition and greater cleaning abilities with less viscosity. However, OBFs present greater environmental challenges.

Synthetic-based fluids (SEF) are muds where the base fluid is a synthetic oil. These include highly refined mineral oil-based fluids and fluids derived from vegetable and animal sources. SBFs are often used on off-shore rigs because they have many of the properties of oil-based fluids, but the fluid fumes have a lower toxicity than fumes associated with oil-based fluids. Synthetic based fluids include internal olefins (IO), poly-alpha-olefins (PAO), linear-alpha-olefins (LAO), acetyls di-ethers, linear paraffins, detergent alkalytes, polyols, methyl glycoside (MEG) and ester-based fluids (EBF).

The esters are made from vegetable oil by reacting a fatty acid with an alcohol. Examples include PETROFREE™, FINAGREEN™ and ECOGREEN™.

Di-ethers are made by reacting alcohols to give a monoether which is converted into a di-ether. An example is AQUAMUL II™.

PAOs are straight-chained hydrocarbons made from ethylene. The resulting product may have no aromatic content. An example is NOVADRIL™.

LAOs are the result of the oligomerization (low molecular weight polymerisation) of ethylene molecules.

IOs are isomers of the LAOs, ie having the same chemical formula with different structures, for example the position of a carbon double bond. An example is NOVAPLUS™.

Linear paraffins are saturated linear polymers made from ethylene. An example is PARADRIL™.

Detergent alkalytes, also known as linear detergent alkalytes, are widely available and are used as an intermediary in the production of various detergents. Linear Alkyl Benzene (LAB) is manufactured by reacting a saturated hydrocarbon with benzene. LABs contain a small amount of aromatics.

Polyols, or polyhydric alcohols, are chemicals with multiple OH groups attached. They include glycols (dihydric) and glycerols (trihydric) as well as a variety of sugar alcohols. Polyols for mud use generally refer to the polymeric form of these polyhydric alcohols. They can be manufactured to a variety of molecular weights from a variety of raw materials. Examples of commercially available products are BIO-DRIL 1402™ and HYDRA-FLUIDS HF-100™.

Methyl glucoside (MEG) is a derivatives of the sugar glucose. MEG has a methoxy side group ($-OCH_3$) on the glucose ring that stabilises the molecule. The molecule itself has four hydroxyl groups (OH) attached to the ring. An example is GEO-MEG™.

The SBFs may be manufactured to varying carbon chain lengths and differing amounts and types of side chains and hydroxyl, oxygen, ester or ether components.

Key environmental issues associated with drilling fluids relate to environmental performance and the persistence of cuttings piles. Disposal of drill cuttings and associated drilling fluids is a crucial issue. The smoldering combustion reaction vessel 326 provides a means of addressing the environmental problems associated with drill cuttings.

The drill cuttings provide a porous matrix. SBFs which remain in the drilling cuttings 324 provide both a contaminant and a fuel for the smoldering combustion process. In many cases the drilling cuttings 324 include a sufficient proportion of SBFs to support the smoldering combustion process. Generally the drill cuttings contain around 1%-10% oil. Where this is not the case, additional fuel may be added to the porous combustible mixture that is introduced into the reaction vessel 326.

It will be understood that the invention disclosed and defined in this specification extends to all alternative combinations of two or more of the individual features mentioned or evident from the text or drawings. All of these different combinations constitute various alternative aspects of the invention.

What is claimed is:

1. A method for treating a volume of porous contaminated material, comprising:
   providing a combustible mixture comprising a porous matrix and a distributed combustible contaminant;
   conveying the combustible mixture to a reaction vessel having an ignition system;
   activating the ignition system to initiate a smoldering combustion process in the reaction vessel;
   distributing an oxidizer into the reaction vessel to sustain the smoldering combustion process;
   removing cleaned material from the reaction vessel that has been remediated by combustion in the smoldering combustion process;
   monitoring an amount of cleaned material removed from the reaction vessel;
   replenishing the combustible mixture in the reaction vessel to sustain the smoldering combustion process; and
   controlling a rate of replenishing the combustible mixture dependent on the monitored amount of removed cleaned material.

2. The method of claim 1 wherein the porous matrix comprises drill cuttings and the distributed combustible contaminant comprises drilling fluid.

3. The method of claim 2 wherein the drilling fluid is an oil-based drilling fluid.

4. The method of claim 3 wherein the drilling fluid is a synthetic drilling fluid.

5. The method of claim 4 wherein the synthetic drilling fluid is selected from the group consisting of internal olefins, poly-alpha-olefins, linear-alpha-olefins, acetyls, di-ethers, linear paraffins, detergent alkalytes, polyols, methyl glucoside and ester-based fluids.

6. The method of claim 1 further comprising:
collecting off-gases from the reaction vessel during the smoldering combustion process; and
processing the off-gases to recover contaminants vaporised in the reaction vessel.

7. The method of claim 6 wherein the contaminants vaporized in the reaction vessel comprise mercury.

8. The method of claim 1 wherein the combustible mixture contains seeds and the smoldering combustion process renders the seeds incapable of germination.

9. The method of claim 1 wherein the combustible mixture contains biological waste and the smoldering combustion process sterilizes the biological waste.

10. A system for treating drill cuttings comprising:
a separation system that receives material from a well-drilling operation, the material comprising drill cuttings and drilling fluid, the separation system (a) extracting drilling fluid for recycling back to the well-drilling operation and (b) providing an output comprising the drill cuttings and residual drilling fluid;
a reaction vessel that receives the output of the separation system, the reaction vessel comprising: i) an ignition system; and ii) a distribution structure for distributing a gaseous oxidizer into the reaction vessel; and
a control system in data communication with the ignition system and the distribution structure, the control system comprising a non-transitory computer readable medium having a computer readable code embodied therein, the computer readable code programmed with software instructions for executing on one or more data processors to:
A) activate the ignition system to initiate a smoldering combustion process in at least a portion of the material in the reaction vessel;
B) control the distribution of the oxidizer into the reaction vessel to sustain the smoldering combustion process;
C) monitor an amount of cleaned material removed from the reaction vessel that has been remediated by the smoldering combustion process; and
D) control a rate of replenishing the material in the reaction vessel dependent on the monitored amount of removed cleaned material to sustain the smoldering combustion process.

* * * * *